Aug. 9, 1932.  F. L. BRYANT  1,870,279
METHOD OF MAKING LAYERS OF DISTENDED FIBROUS MATERIAL
Filed May 16, 1930  3 Sheets-Sheet 1
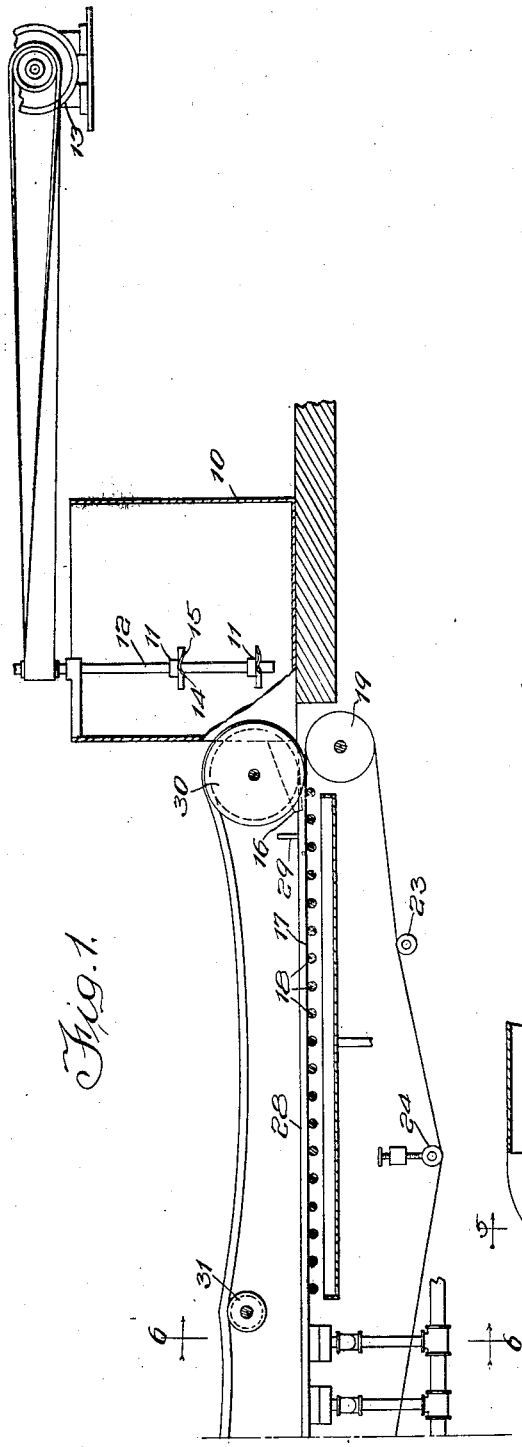
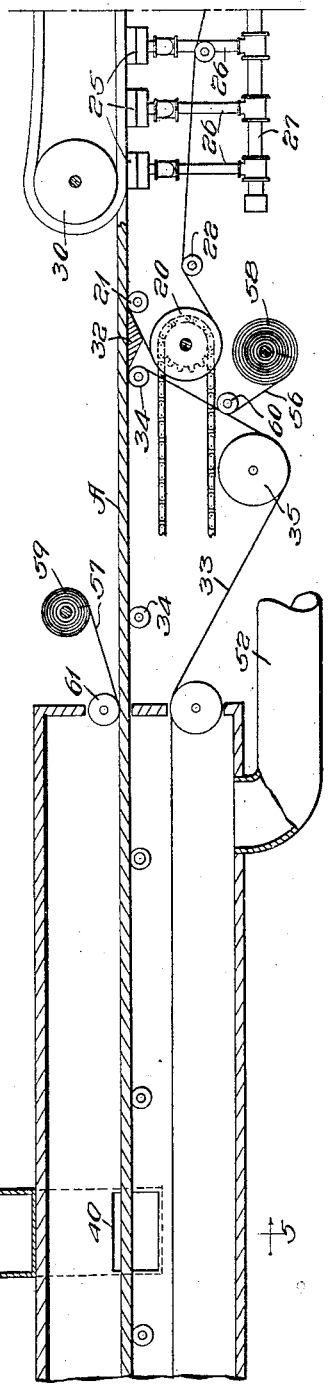
Inventor:
Frank L. Bryant

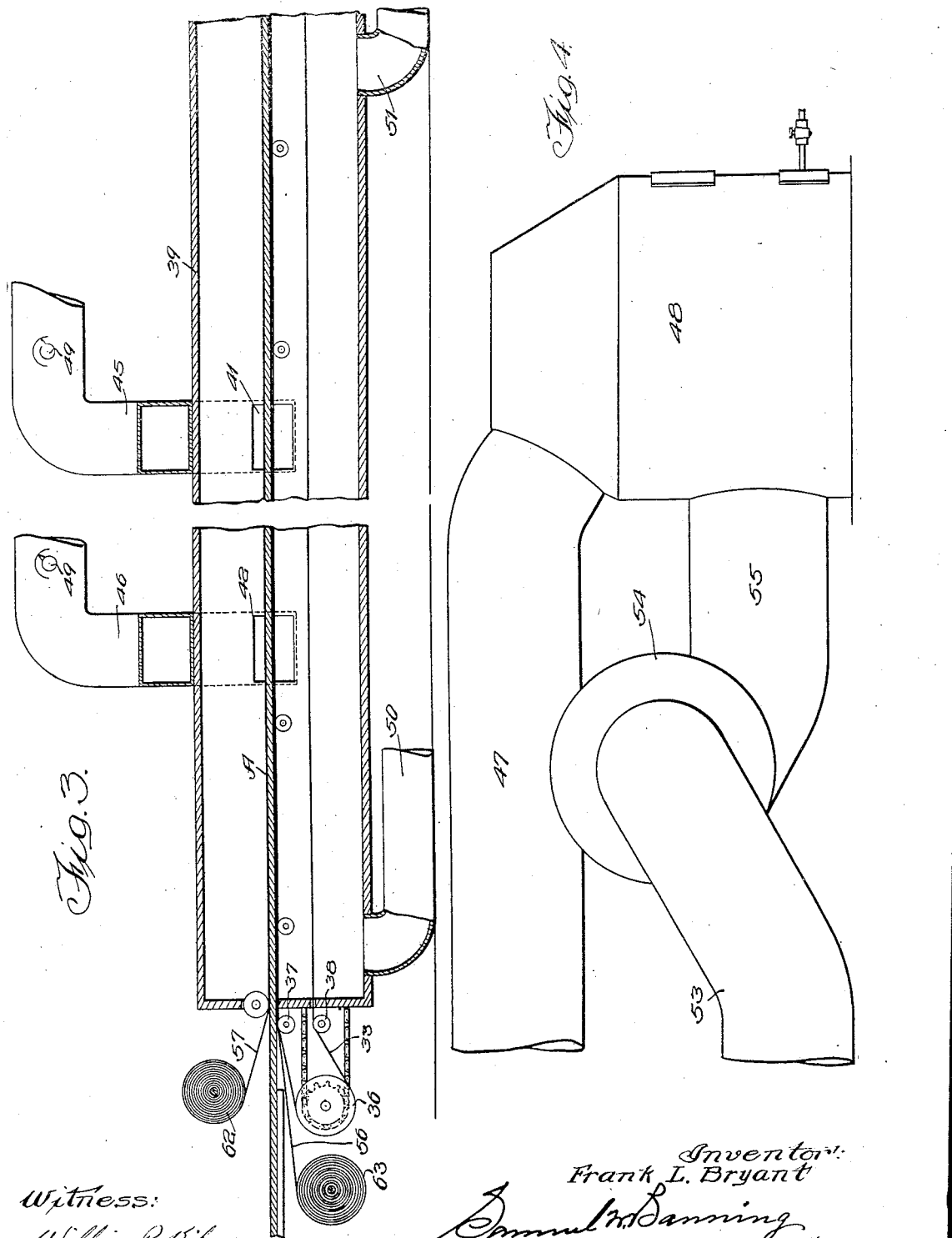

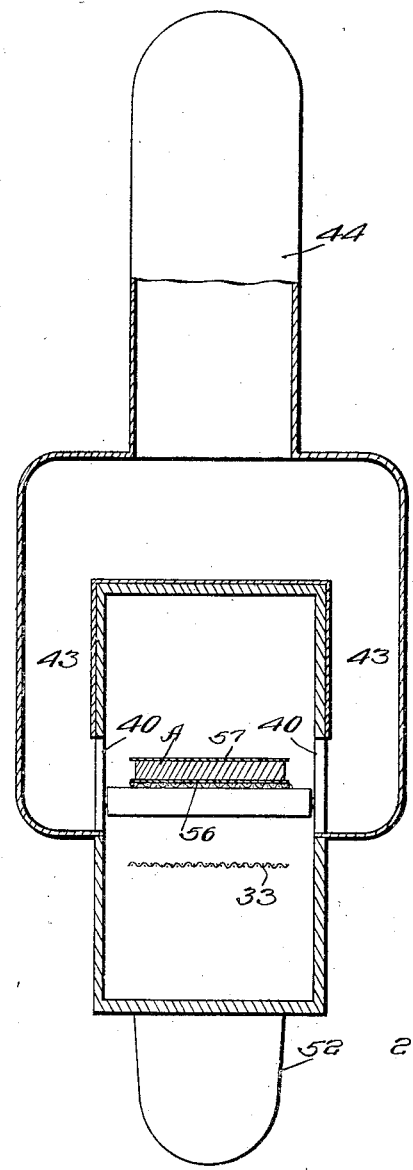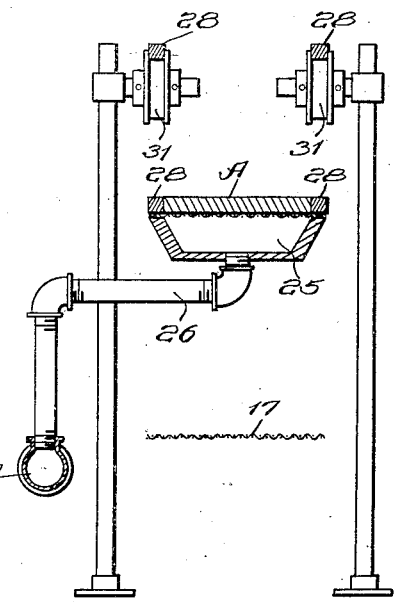

Patented Aug. 9, 1932

1,870,279

UNITED STATES PATENT OFFICE

FRANK L. BRYANT, OF CHICAGO, ILLINOIS, ASSIGNOR, BY MESNE ASSIGNMENTS, TO CELLUFOAM CORPORATION, OF CHICAGO, ILLINOIS, A CORPORATION OF DELAWARE

METHOD OF MAKING LAYERS OF DISTENDED FIBROUS MATERIAL

Application filed May 16, 1930. Serial No. 452,900.

My present invention relates to a method of continuously manufacturing the distended fibrous material which forms the subject matter of Patent No. 1,740,280, issued December 17, 1929.

The material in question is formed of cellulose fibres which are impregnated with a bubble-forming or foam-forming ingredient, which when agitated causes the fibrous mass to distend by the formation of minute bubbles throughout the mass, so that its volume becomes greatly augmented, with the result that when fed forward in the form of a layer and dried under conditions which prevent it from being crushed down or pressed, it assumes the form of a light fluffy layer adapted to subserve numerous purposes for which a material of this character having absorptive properties is fitted, and is also adapted in coarser form for use as a packing for furniture or fragile articles.

The bubble-forming or film-forming ingredients include, among other substances, the carbohydrates, for instance, the starches and dextrins, some of the albumens, such as egg albumen, and some of the glucoside, particularly saponin, as more fully set out in my patent above identified.

It is of the utmost importance that the mass of fibrous material, cellulose or the like, be thoroughly impregnated with bubble-forming ingredients and distended without breaking or shortening the minute fibres which compose the mass, and with this end in view the mass in liquid form is subjected to agitation by a special form of agitating blades so designed as to give to the mass under treatment a swift vortical movement having a centrifugal component and a downwardly directed component, and of so directing these movements with respect to the tank or container within which the mass is held that there will also be imparted to the mass a surging in and out movement which more fully tends to thoroughly impregnate the bubble-forming ingredients and to cause the necessary frothing and distension without disrupting the minute fibres, and this agitation process is continued until the mass assumes a creamy consistency and becomes distended to two or three times its original volume, at which time the mass is in condition to permit it to be discharged from the agitating receptacle in the form of a thick sheet or layer which as discharged is preferably of quite substantial depth or thickness. Suitable results are obtained by the discharge of a layer of from one inch to an inch and a half in thickness, although, of course, the thickness of the layer will depend in considerable measure upon the purpose for which the layer is intended and the degree to which it has been distended by the bubble-forming or foam-forming ingredients contained in the mixture.

The layer of material is discharged onto the moving foraminous bed of a Fourdrinier machine which carries the material forward in the form of a continuous layer of uniform thickness and serves to permit a large portion of the moisture to drain away from the layer and/or to be extracted by suction in a manner well known in the paper making industry, but it must be clearly understood that the layer of material in question in no proper sense resembles a sheet of paper, since it is of far greater thickness and the treatment to be observed is one which is intended to maintain the fluffy distended condition of the layer rather than to compact the fibres into a thin, tough coherent sheet, which is the object sought in the use of a Fourdrinier machine in the making of a sheet or web of paper.

The continuous layer of material is carried forward by the foraminous belt or bed and is delivered in a partially dry but undisturbed condition at the end of the Fourdrinier machine, directly into an elongated drying chamber, through which travels an endless belt or carrier, preferably of foraminous wire mesh or similar material, and during the progress of the layer through the drying chamber, the remaining moisture is evaporated by heat, so that at the delivery end of the drying chamber the layer is discharged in a dry but undisturbed and uncompacted condition, to be cut up into sections of the proper length and size to fit the intended use.

The mass of material, when in condition for discharge from the agitating tank, is composed mainly of water through which the fibres are interspersed and held in distended condition by the bubbles which are themselves interspersed through the water, which latter constitutes a continuous phase.

If the water were suddenly or violently extracted from the mass, either by suction or by mechanical compression or retardation, it would have the effect of breaking down the cellular formation occasioned by the presence of the bubbles interspersed through the fibres and holding them in distended condition. It therefore becomes necessary to remove the water gradually in order that the bubbles may persist until the material reaches the final drying stage, so that the ultimate drying, which results in a disruption of the bubbles, will leave the fibres in a fully distended condition.

It is therefore necessary, in discharging a layer of material from the agitating tank onto the foraminous bed of the Fourdrinier machine, to effect the discharge of the mass, including the full water content, in the agitated and frothy condition resulting from the agitation within the tank, and the mechanism hereinafter described is especially designed to attain this result.

In order to prevent staining by the evaporation of the chemicals employed to distend the mass, it is desirable, during the progress of the layer through the drying chamber, to contact and protect the upper and lower surfaces of the layer with sheets of absorbent material, which may be in the form of continuous strips of absorbent paper or fabric which serve, by contact and capillary action, to draw the liquid chemicals from the surfaces of the layer, and effect the ultimate evaporation of the liquid constituents upon the surfaces of the protective strips, thus preventing staining of the material itself, and the present process includes this protective step in the drying operation.

Throughout the entire progress of the layer of distended fibrous material from its discharge from the agitating receptacle until its final delivery at the far end of the drying chamber, the layer of material will be adequately supported in an undisturbed condition and without subjection to the pressure of rolls or the like which are employed in the paper making industry, since the object sought in the present case is directly the reverse of the compacting effect which is required in the making of paper to give it the desired strength and toughness.

In order to more fully elucidate the details of the present process, as practiced upon mechanism of a character particularly designed for the present purpose, reference may be had to the accompanying drawings, wherein,—

Figures 1, 2 and 3 comprise longitudinal sectional views of successive portions of one and the same machine designed to continuously produce layers of distended material;

Fig. 4 is a diagrammatic view, showing the furnace and connecting hot air ducts, and blower employed for delivering hot air to the drying chamber;

Fig. 5 is a sectional elevation through the drying chamber, taken on line 5—5 of Fig. 2; and Fig. 6 is a sectional elevation, taken through one of the vacuum boxes of the Fourdrinier portion of the apparatus illustrated in Fig. 1.

The apparatus as a whole comprises a tank 10, within which the material is agitated and distended by the action of propeller blades 11—11 mounted upon a vertical shaft 12 which is suitably driven from a motor 13 or other source of power.

The shaft 12 is located off-center with respect to the tank 10, which is circular, so that as the material is driven outwardly by the action of the propeller blades, it will sweep around the wall of the tank and be alternately directed inwardly toward the propeller blades and outwardly and away therefrom during its circuit around the tank.

The blades 11 of the propeller are formed with downwardly turned tips 14, while the body of each blade is turned upwardly, as indicated at 15, with the result that when rotating the blades will have the effect of imparting a combined downward and outward thrust to the material, which gives the vortical motion, and which, combined with the surging action caused by the eccentric relation of the blades to the tank, serves to thoroughly agitate the material without any tendency to break up the minute fibres.

After the material has been thus agitated for a sufficient period to cause it to distend to about two and a half times its original liquid volume, and while it is in a creamy state due to the presence of the minute bubbles formed therein, it is discharged in the form of a layer from a spout 16 located near the bottom of the tank, and onto the traveling foraminous bed or carrier 17 of a Fourdrinier machine.

The bed is preferably formed of fine mesh wire screening and is carried upon supporting rollers 18, and passes around a front idle roller 19 and a rear power driven roller 20. Immediately in advance of the power driven roller 20, the belt or carrier passes downwardly over a supporting roller 21, and the lower turn of the belt or carrier passes over a rear guide roller 22, a forward guide roller 23, and under a tension roller 24.

Near the rear end of the Fourdrinier machine are located a series of suction boxes 25 connected by pipes 26 with a vacuum header 27 adapted to maintain a partial vacuum of moderate amount in the vacuum boxes, although in the present instance it is desirable, as a rule, to maintain a much less degree of vacuum than is commonly employed in the paper making art in which vacuum is relied upon in part to suck down and compact the fibres of the paper web, while in the present case any such compacting action is to be avoided.

In order to give proper definition to the width of the layer, gauge belts 28, of rubber or suitable composition, are employed, one on each side of the bed or carrier, and these belts are properly held and supported to rest upon and travel with the carrier and constitute side walls or flanges for gauging the depth of the layer of material and to afford a sharp or cleancut edge to the layer.

In order to insure a proper depth of material, which should ordinarily be flush with the lower turns of the gauge belts, a scraper bar 29 is provided immediately to the rear of the spout 16, which serves to level down the layer to the level of the gauge belts.

The gauge belts are mounted upon grooved rollers 30, at the forward and rear ends thereof, and the upper turn of each belt is supported by an intermediate roller 31 which allows the lower turn to rest bodily upon the moving carrier of the Fourdrinier machine and to travel therewith by friction, without the necessity of providing means for positively feeding the gauge belts.

The layer of material A passes from the traveling conveyor over a stationary shoe 32 and onto the surface of an endless carrier belt 33, the upper turn of which lies flush with the surfaces of the carrier 17 and the shoe 32.

The carrier belt 33 is carried upon supporting rollers 34 and passes under a forward roller 35 suitably spaced to distend the forward end of the belt, and thereby cause the lower turn to move upwardly in an oblique relation to the forward roller 34, as indicated in Fig. 2.

The carrier belt 33 passes over a rear power driven roller 36, and the upper and lower turns in proximity to the power driven roller are supported on guide rollers 37 and 38 respectively.

The upper and lower turns of the endless carrier 33 both pass through an elongated drying chamber 39 of box-like formation, which as shown is supplied with heated air through forward, intermediate, and rear ports 40, 41, and 42, respectively, the first of which is located near the forward end of the drying chamber, while the last occupies a position near the discharge end thereof.

Each of the ports, as shown in Fig. 5, is in duplicate, and discharges from each side into the drying chamber at a level with the carrier therein, so that the hot air will be discharged both above and below the layer of material being dried, and the duplicate ports in each instance communicate with side ducts 43 which pass upwardly around opposite sides of the drying chamber and receive heated air from an air delivery duct 44. Similar delivery ducts 45 and 46 deliver heated air to the intermediate and rear discharge ports 41 and 42 respectively.

The discharge ducts 44, 45 and 46 all constitute branches of a main delivery duct 47 connecting with the hot air chamber of a furnace 48, and by reason of the progressively increasing distance from the duct 47, of the ducts 44, 45 and 46, the air discharged through the discharge ports 40 will be at a higher temperature than the air discharged through the more distant ports, which is desirable in order to subject the progressively drying layer of material to varying and progressively lowering temperatures as it travels through the drying chamber, since in the wetter condition in which it enters the drying chamber it will stand a higher drying temperature than is desirable at the subsequent stages in its progression toward the point of delivery.

In order to more effectively regulate the temperatures, each of the ducts 44, 45 and 46 may be provided with a damper 49.

The air is withdrawn from the bottom of the drying chamber through return ducts 50, 51 and 52, which unite in a main return duct 53 communicating with an exhaust fan 54 which in turn delivers the returned air to the lower portion of the furnace 48 through a duct 55.

In order to protect the upper and lower surfaces of the layer of material against the staining effect due to surface evaporation of chemicals, strips of absorbent material 56 and 57 are provided, the former of which is fed from a lower roll 58 and the latter of which is fed from an upper roll 59. A guide roll 60 serves to bring the lower absorbent strip 56 into contact with the surface of the endless carrier 33, so that the layer of material, in passing onto the carrier, will not directly contact the surface thereof, but will rest upon the lower strip 56 of absorbent material.

Similarly, the upper strip 57 is guided beneath a roller 61 and bears lightly yet firmly upon the upper surface of the layer of expanded material, so that, during the progress of the layer of material through the drying chamber, both the upper and lower surfaces will be adequately protected, and the moisture drawn outwardly will absorb into the absorbent sheets and be ultimately evaporated upon the surfaces thereof, thereby preventing staining of the layer.

The upper and lower absorbent strips may be wound upon rolls 62 and 63, for further use, if desired, or where cheap absorbent paper is employed, it may be discarded after its emergence from the drying chamber.

In carrying out the method of the present invention, in conjunction with mechanism of the general character above described, the material will be continuously agitated, and distended and discharged from the agitating tank at a rate of speed commensurate with the travel of the carriers on the Fourdrinier machine, and in the drying chamber; and the rate of speed, the length of the drying chamber, and the degree of heat applied thereto will in all cases be properly harmonized, with due regard to the thickness of the layer, the degree of its distension, and the amount of moisture extracted prior to its delivery into the drying chamber.

It is desirable, after the machine has once been started, and after the continuous layer has begun to advance, to continue the operation without disturbance or interruption, in order that the uniformity of texture of the product and the thickness thereof may not be varied by disturbing influences. At no stage in the operation is the layer subjected to influences which would tend unduly to compact it or crush it down so that it emerges from the end of the drying chamber in the form of a finely textured fluffy and absorbent layer having sufficient coherence and strength to be self-sustaining, and at the same time possessing the soft and fluffy qualities and the absorbent character which are particularly desired in a material of this kind.

Where the material is intended for packing rather than for sanitary or other absorbent purposes, coarser materials may be employed and a less degree of distension will suffice, and in cases where a slight staining of the surface is not objectionable, the use of the absorbent protective sheets or layers may be dispensed with, although in some cases it may be desirable to employ a sufficient amount of glutinous or adherent material in the mixture to cause adherence of such absorbent sheets, in which case the resulting product will be in the form of a distended layer constituting a core with two protective surface sheets adhering thereto. Such a material affords a highly desirable packing material for the packing of fragile articles, such as radio tubes, electric light bulbs, or delicate articles of bric a brac or the like.

It will be understood that the description of the mechanism herein contained is by way of exemplification of the process in its more refined details, and that it is not the intention of the claims to limit the perfomance of the process to mechanism of the particular character illustrated and described, since the same method may be performed in substantially the manner indicated on mechanisms of varying character. In some cases, the material may be fed directly onto the surface of an endless carrier which overlies the bed of the Fourdrinier machine, and continues uninterruptedly on through the drying chamber, or if desired the underlying absorbent sheet may be fed directly to the surface of the Fourdrinier machine and into underlying relation to the layer of material as it is delivered onto the Fourdrinier machine, and if desired the overlying absorbent sheet may be brought into contact near the point of discharge onto the Fourdrinier machine, and one or both sheets may continue in contact with the layer throughout its entire period of travel and delivery from the drying chamber.

Although the distended fibrous material of the present invention may be advantageously produced by the method specifically described in Patent No. 1,740,280, granted Dec. 17, 1929, it is not the intention, unless expressly so stated in the claims, to limit the present invention to the use of the particular methods for distending the fibrous material, since the present invention relates in the main to the method of treating fibrous materials distended by any suitable method in such a way as to produce a continuous layer of substantially uniform dimensions.

I claim:

1. The method of producing a layer of fluffy distended material, which consists in subjecting the ingredients thereof to agitation to produce distension by the formation of bubbles throughout the mass, discharging the material so distended in the form of a continuous layer, feeding forward the layer under conditions permitting partial draining of the liquid therefrom, continuing the feeding in an uninterrupted manner and without compression of the layer of material through a zone subjected to a drying temperature, and delivering the sheet in uncondensed and distended form at a point beyond the drying zone, and contacting the surface of the layer with a material adapted to absorb moisture therefrom while passing through the drying zone to prevent surface discoloration of the layer of material.

2. The method of producing a layer of fluffy distended material, which consists in subjecting the ingredients thereof to agitation to produce distension by the formation of bubbles throughout the mass, discharging the material so distended in the form of a continuous layer, feeding forward the layer under conditions permitting partial draining of the liquid therefrom, continuing the feeding in an uninterrupted manner and without compression of the layer of material through a zone subjected to a drying temperature, and delivering the sheet in uncondensed and distended form at a point beyond the drying zone, and contacting the surface of the layer with a material adapted to absorb moisture therefrom.

3. The method of producing a layer of fluffy distended material, which consists in combining fibrous material with water and bubble forming ingredients, subjecting the liquid mass to agitation to produce distension by the formation of bubbles throughout the mass, discharging the material so distended and before substantial reduction of the liquid content, in the form of a continuous layer composed of fibrous material distended by the inclusion of bubbles throughout the liquid content, feeding forward the layer under conditions permitting partial draining of the liquids therefrom without disruption of the bubbles, continuing the feeding in an uninterrupted manner and without compression of the material through a zone subjected to a drying temperature to remove most of the remaining moisture, and delivering the sheet in uncondensed and distended form at a point beyond the drawing zone.

4. The method of producing a layer of fluffy distended material, which consists in combining fibrous material with water and bubble forming ingredients, subjecting the liquid mass to agitation to produce distension by the formation of bubbles throughout the mass, discharging the material so distended and before substantial reduction of the liquid content, in the form of a continuous layer composed of fibrous materials distended by the inclusion of bubbles throughout the liquid content, feeding forward the layer under conditions permitting partial draining of the liquids therefrom without disruption of the bubbles, and finally extracting additional moisture to produce the condition of dryness required under conditions which obviate any compacting effect upon the sheet, and delivering the sheet in distended substantially dry condition.

5. The method of producing a layer of fluffy distended fibrous material, which consists in combining fibrous material with water and bubble forming ingredients adapted under agitation to form minute bubbles dispersed throughout the water content and serving to distend the fibrous material, subjecting the mass to a vortical agitating effect adapted to cause formation of bubbles and distension of the fibres without the breaking down of the fibres of the material, discharging the material so distended and before substantial reduction of the liquid content, in the form of a continuous layer composed of fibrous materials distended by the inclusion of bubbles throughout the liquid content, and advancing the continuous layer without disturbance or compression until the required amount of additional moisture has been gradually removed therefrom under conditions which avoid the compacting of the fibrous materials, and in finally discharging the layer in the form of a substantially dry, fluffy, coherent, distended mass.

6. The method of producing a layer of fluffy distended fibrous material, which consists in combining fibrous material with water and bubble forming ingredients adapted under agitation to form minute bubbles dispersed throughout the water content and serving to distend the fibrous material, subjecting the mass to a vortical agitating effect adapted to cause formation of bubbles and distension of the fibres without the breaking down of the fibres of the material, discharging the material so distended and before substantial reduction of the liquid content, in the form of a continuous layer composed of fibrous materials distended by the inclusion of bubbles throughout the liquid content, and advancing the continuous layer without disturbance or compression until the required amount of additional moisture has been gradually removed therefrom under conditions which avoid the compacting of the fibrous materials, and in finally discharging the layer in the form of a substantially dry, fluffy, coherent, distended mass, a part of the travel of the material being under conditions adapted to promote drainage of liquid constituents and a part of the travel being under heated conditions.

7. The method of producing a layer of fluffy distended material, which consists in combining fibrous material with water and bubble forming ingredients, subjecting the liquid mass to agitation to produce distension by the formation of bubbles throughout the mass, flowing the material so distended and before substantial reduction of the liquid content, from the region of agitation in the form of a continuous layer of uniform depth composed of fibrous materials distended by the inclusion of bubbles within the liquid, continuously advancing the layer thus fed and subjecting the same to conditions tending gradually and without disruptive disturbance to remove some of the water without premature immediate breaking down of the bubble formation, during the earlier stage of the drying operation and in thereafter continuing the removal of water until the layer has been brought to the desired degree of dryness.

8. The method of producing a layer of fluffy distended material, which consists in combining fibrous material with water and bubble forming ingredients, subjecting the liquid mass to agitation to produce distension by the formation of bubbles throughout the mass, flowing the material so distended and before substantial reduction of the liquid content, from the region of agitation in the form of a continuous layer of uniform depth composed of fibrous materials distended by the inclusion of bubbles within the liquid, continuously advancing the layer thus fed and subjecting the same to conditions tending gradually and without disruptive disturbance to remove some of the water without premature breaking down of the bubble formation, during the earlier stage of the drying operation and in thereafter continuing the removal of water until the layer has been brought to the desired degree of dryness, the final extraction of the liquid content being within a heated drying zone.

In witness that I claim the foregoing I have hereunto subscribed my name this 13th day of May, 1930.

FRANK L. BRYANT.